Patented Jan. 31, 1939

2,145,390

UNITED STATES PATENT OFFICE 2,145,390

HALOGEN CONTAINING BUTADIENE DERIVATIVES

Erich Gebauer-Fuelnegg, deceased, late of Gary, Ind., by Marie Gebauer-Fuelnegg, administratrix, Evanston, Ill., and Floyd E. Williams, Gary, Ind., assignors to Marbon Corporation, Chicago, Ill., a corporation of Delaware No Drawing. Application July 9, 1935,
Serial No. 30,514

1 Claim. (Cl. 106—23)

This invention relates to halogen containing butadiene bodies. More particularly it relates to halogen containing rubber compositions produced by flowing asymmetrical rubber hydrohalides under the influence of pressure and heat. The invention includes products made from the composition, such as molded masses, thin flexible films, and coated objects.

It is an object of this invention to produce new and useful compositions from reaction products of hydrogen halides and rubber.

It is another object of this invention to produce homogeneous, dense masses containing asymmetrical rubber hydrochloride without the use of solvent.

It is a further object to produce flexible, dense sheets suitable for master batching and other purposes from the reaction product of liquefied hydrogen chloride on rubber.

Another object is to produce thin, permanently flexible sheets from rubber and hydrogen chloride without the use of solvents at any stage of the manufacturing operation.

Another object is to produce molded articles from the reaction product of liquefied hydrogen chloride on rubber.

Another object is to produce articles of manufacture composed essentially of amorphous rubber derivatives without the use of solvents and their subsequent evaporation.

In the present invention asymmetrical rubber hydrohalides are flowed by means of pressure accompanied by heat, which may be the internal heat produced by the pressure flowing of the product or external heat applied with the pressure to aid in flowing the mass. The composition of the resulting product differs depending on the amount and type of mechanical treatment accorded during the pressing operation, on the time of exposure of the product to heat and on the temperature attained during the heating and pressing.

The preferred product is a dense, homogeneous mass obtained by flowing the light porous reaction product of liquefied hydrochloride and rubber into an integral mass at as low a temperature as is possible to flow the product. With higher pressures lower temperatures may be used, but there is, of course, heat produced during the flowing of the product even on a cold roll or press. In general the higher the temperature and the longer the time of contact the softer the product and the greater the decomposition of the original reaction product into other products.

For the obtaining of dense, only slightly decomposed masses, the preferred method is to flow the reaction product of liquefied hydrogen chloride and rubber in the presence of materials which are or become fluid at or below the temperature at which the asymmetrical product becomes fluid, and particularly with high boiling materials which are solvents for the asymmetrical rubber hydrochloride and which definitely plasticize it when used in amounts of five to ten parts per hundred parts of rubber hydrochloride. By the use of thermal plasticizers, materials which are fluid during the molding or calendering, but which are hard at ordinary temperature, stronger and harder products may be obtained by milling or rolling.

In the production of calendered sheets and molded products the homogeneous incorporation of the plasticizer is of importance. The plasticizer may be incorporated in various ways.

Homogeneous compositions of rubber hydrochloride and plasticizers may be produced by milling of the rubber hydrochloride with plasticizer, but the compositions so produced are partially decomposed.

Another method is to dissolve the rubber hydrochloride and plasticizer in a volatile common solvent and allow the excess solvent to evaporate. The mixture of rubber hydrochloride, high boiling plasticizer or solvent and low boiling solvent is kneaded to produce a homogeneous composition, allowing the volatile solvent to evaporate during the kneading operation until only a small proportion remains. The resulting homogeneous mass is ready for calendering or molding.

Less homogeneous and consequently less suitable mixtures may be produced by simply allowing the plasticizer to diffuse into sheets of rubber hydrochloride.

The following examples are given to illustrate the invention:

Example I

Fifteen parts by weight of Paroil #25, a liquid chlorinated paraffin, is incorporated with 100 parts by weight of asymmetrical rubber hydrochloride in sheet form. The materials may be mixed together in any way, but preferably so that a homogeneous mixture is obtained. Various antioxidants commonly used in the rubber art may be added with the chlorinated paraffin and mixed into the rubber hydrochloride. The mixture is then run through a calender roll, the temperature being kept as low as possible, and still obtain an integral sheet. Warm calender rolls are preferred with the sheets being run through intermittently until the temperature has risen sufficiently to flow the solid rubber hydrochloride and obtain a homogeneous integral thin sheet comprising asymmetrical rubber hydrochloride, decomposition products therefrom and plasticizer, but not sufficiently to cause any large amounts of decomposition. Instead of calendering, sheets may be produced by molding under high pressure of about 2000 pounds per square inch and at temperatures of 220° F. With higher pressures lower external temperatures may be used. Also with high boiling solvents such as chlorinated paraffin, cold rolling or pressing may be done without actually melting the rubber hydrochloride, although elevated temperatures are preferable, especially for small amounts of high boiling solvents.

The amount of chlorinated paraffin may be varied within wide limits. The greater the proportion of chlorinated paraffin present the softer and weaker is the final product. It is, therefore, advisable to keep the amount of plasticizer as low as possible, yet sufficient to give flexibility which is of aid in the rolling and sufficient to definitely aid in the diffusion of the internal heat produced during calendering. With the asymmetrical rubber hydrochloride the amount of plasticizer required to give a definite softening point or a definite flexibility is much less than for the symmetrical rubber hydrochloride so that sheets and masses may be made from the reaction product of liquefied hydrogen chloride on rubber, which have higher tensile strength than the symmetrical crystalline compounds for the same amount of plasticizer present.

*Example II*

100 parts of asymmetrical rubber hydrochloride
25 parts of carbon tetrachloride
5 parts of chlorinated paraffin
15 parts of hard arochlor (chlorinated diphenyl of high chlorine content)

The materials are incorporated in any of the ways described above, preferably by the solution methods since carbon tetrachloride is a common solvent. The mixture is then calendered into thin sheets, the carbon tetrachloride practically entirely evaporating during the rolling operation. The same mixture may be molded into thin sheets or other articles.

*Example III*

Instead of directly calendering or molding the asymmetrical amorphous product, it may be given a preliminary milling treatment. By this means various materials including inert material, rubber, carbon black, wood floor, plasticizers may be incorporated with the asymmetrical amorphous rubber hydrochloride into a dense homogeneous integral sheet which may be rolled into bundles and sold as an article of manufacture suitable for master batching purposes and for use directly in molding into useful articles or calendering into thin sheets. The temperature of milling should be kept as low as possible, consistent with obtaining an integral mass in order to keep down the amount of decomposition where products of highest tensile strength are desired. However, where soft products of low tensile strength are desired, the decomposition may be allowed to proceed, but preferably not to the point where there are no halogen containing derivatives present. The preferred product made without stabilizers is composed essentially of amorphous rubber derivatives, the major proportion of, for example, 60% to 95% of the composition being asymmetrical rubber hydrochloride with smaller amount of asymmetrical rubber hydrochloride decomposition products and polymerized and cyclic rubber of unknown composition, some of which were present in the original reaction product and some produced during the heat treatment. Although such milled sheets and calendered thin sheets made therefrom are relatively weak and flabby compared to cast sheets and stabilized sheets, they may be found valuable where light colored self sustaining sheets are not required. They may be roll coated on web material or incorporated into web material by rolling. The sheets which have been milled into an integral mass are also much more readily molded than unmilled sheets or powdered compositions.

*Example IV*

100 parts asymmetrical rubber hydrochloride are incorporated and pressed with 25 parts of a chlorinated diphenyl of a type which is fluid at the temperature attained during the pressing operation, but a hard product at room temperature. In place of hard arochlors, other materials which are hard at room temperature but fluid during the temperature attained during calendering or molding, may be used. Such rubber hydrochloride compositions containing hardeners are particularly suited for molding.

*Example V*

100 parts asymmetrical rubber hydrochloride
5 parts chlorinated diphenyl ether

The materials are homogeneously mixed and molded or calendered.

*Example VI*

100 parts rubber hydrochloride
2 parts chlorinated paraffin
2 parts chlorinated diphenyl (hard arochlor)
2 parts chlorinated diphenyl ether The materials are homogeneously mixed and molded or calendered.

*Example VII*

100 parts of the reaction product of hydrogen chloride and rubber
50 parts of casein The casein may be incorporated with the rubber hydrochloride in various ways. The proportion of casein may vary in wide limits. With the casein there may be incorporated plasticizers, especially such as are plasticizers for both casein and rubber hydrochloride. In place of casein other proteins, such as gelatin, may be used but casein is preferred. Nitrocellulose, cellulose acetate may be incorporated by the use of milling methods and/or common solvents and plasticizers such as butyl stearate, dibutyl phthalate. The mixture of casein, rubber hydrochloride, preferably with a common plasticizer, is then molded into useful articles. Pressures of 2000 pounds per square inch and temperatures of 220° F. may be used.

It is to be understood that numerous details of the process and composition may be varied without departing from the principles of the invention, and it is, therefore, not intended to limit the patent granted hereon, otherwise than necessitated by the prior art. The proportions given in the examples are illustrative of amounts and are not intended to limit the invention to the exact details as the amounts may be varied widely, depending upon the strength, tackiness and other characteristics desired in the product. In place of the reaction product of liquefied hydrogen chloride on rubber equivalent material may be used. The reaction of hydrogen halides on butadiene bodies is a general one and the production of symmetrical and asymmetrical rubber hydrohalides is also a general phenomenon. For the rubber hydrochloride designated in the examples, the asymmetrical reaction product of gaseous hydrogen chloride on undissolved rubber may be used, but the preferred material is the light, porous asymmetrical amorphous reaction product of liquefied hydrogen chloride on undissolved rubber. In place of the hydrogen chloride reaction products, the hydrogen fluoride, hydrogen bromide and hydrogen iodide reaction products are operable.

It is to be understood also that the use of plasticizers is of advantage with all types of rubber hydrochlorides which are to be molded, milled, or calendered. The invention is therefore not limited to the use of asymmetrical rubber hydrohalides, except as pointed out in the claims, although it is with asymmetrical rubber hydrohalides that the use of plasticizers is of particular advantage.

What is claimed is:

The method of producing molded, calendered and like articles of manufacture which comprises subjecting to heat and pressure sufficient to flow into shape a composition including a rubber hydrochloride, a non-thermoplastic filler, chlorinated paraffin and a chlorinated diphenyl of a type which is solid at normal room temperature.

MARIE GEBAUER-FUELNEGG,
*Administratrix of the Estate of Erich Gebauer-Fuelnegg, Deceased.*
FLOYD E. WILLIAMS.